(12) United States Patent
Chmara et al.

(10) Patent No.: US 12,450,355 B2
(45) Date of Patent: Oct. 21, 2025

(54) SECURE UPDATE OF DYNAMIC CONFIGURATION IN CONTAINERIZED EXECUTION ENVIRONMENT

(71) Applicant: Entrust Corporation, Shakopee, MN (US)

(72) Inventors: Thomas P. Chmara, Ottawa (CA); Xavier Guarch, Mendoza (AR); Michael Ounsworth, Sioux Lookout (CA); Andrew Assaly, Kanata (CA); Chad Autry, Plano, TX (US); Serge Jean Maurice Mister, Ottawa (CA)

(73) Assignee: Entrust Corporation, Shakopee, MN (US)

( * ) Notice: Subject to any disclaimer, the term of this patent is extended or adjusted under 35 U.S.C. 154(b) by 202 days.

(21) Appl. No.: 18/297,371

(22) Filed: Apr. 7, 2023

(65) Prior Publication Data
US 2023/0325508 A1  Oct. 12, 2023

Related U.S. Application Data

(60) Provisional application No. 63/328,575, filed on Apr. 7, 2022.

(51) Int. Cl.
*G06F 21/57* (2013.01)
*G06F 8/65* (2018.01)
(Continued)

(52) U.S. Cl.
CPC ............ *G06F 21/572* (2013.01); *G06F 8/65* (2013.01); *G06F 21/53* (2013.01); *H04L 9/3268* (2013.01); *G06F 2221/033* (2013.01)

(58) Field of Classification Search
CPC ...... G06F 21/53; G06F 21/572; G06F 21/602; G06F 2221/033; G06F 8/65; G06F 9/455;
(Continued)

(56) References Cited

U.S. PATENT DOCUMENTS 10,298,577 B1 * 5/2019 Aithal ................. G06F 9/45558
10,298,681 B1 * 5/2019 Makin ................. H04L 67/1097
(Continued)

OTHER PUBLICATIONS

Blomqvist, Markus, Lauri Koivunen, and Tuomas Mäkilä. "Secrets Management in a Multi-Cloud Kubernetes Environment." ( 2021). (Year: 2021).*

(Continued)

*Primary Examiner* — Michael Simitoski
(74) *Attorney, Agent, or Firm* — Merchant & Gould, P.C.

(57) ABSTRACT

A configuration information management system is provided for secure update of dynamic configuration data in a containerized execution environment. A configuration container may be maintained within the environment separately from an application container hosting a secure enterprise application. The secure enterprise application may require secure configuration information for interaction via a secured connection with one or more remote endpoints from within the application container. The configuration container hosts a service that is configured to maintain the secure configuration information on behalf of the secure enterprise application, allowing the secure enterprise application to not persist secure configuration information within the application container.

19 Claims, 9 Drawing Sheets

(51) Int. Cl.
*G06F 21/53* (2013.01)
*H04L 9/32* (2006.01)

(58) Field of Classification Search
CPC ..... G06F 9/5077; G06F 9/468; H04L 9/3268; H04L 9/0894; H04L 67/10; H04L 67/34; H04L 63/20
See application file for complete search history.

(56) References Cited

U.S. PATENT DOCUMENTS

| | | | | |
|---|---|---|---|---|
| 11,477,165 | B1* | 10/2022 | McDowall | H04L 63/02 |
| 2004/0268142 | A1* | 12/2004 | Karjala | H04L 63/0272 726/15 |
| 2017/0228182 | A1* | 8/2017 | Novak | H04L 63/08 |
| 2019/0042759 | A1 | 2/2019 | Smith et al. | |
| 2019/0273746 | A1 | 9/2019 | Coffing | |
| 2019/0288839 | A1* | 9/2019 | Lounsberry | H04L 63/20 |
| 2019/0347406 | A1* | 11/2019 | Lev-Ran | G06F 21/51 |
| 2019/0356494 | A1* | 11/2019 | Chmara | H04L 9/3263 |
| 2020/0082071 | A1* | 3/2020 | Cherny | G06F 21/604 |
| 2020/0287724 | A1* | 9/2020 | Vaddi | H04L 9/0894 |
| 2020/0319907 | A1 | 10/2020 | Jain | |
| 2021/0011816 | A1* | 1/2021 | Mitkar | G06F 11/301 |
| 2021/0135864 | A1 | 5/2021 | Salmela et al. | |
| 2021/0382727 | A1 | 12/2021 | Vigil et al. | |
| 2022/0019454 | A1* | 1/2022 | Desai | G06F 9/547 |
| 2022/0109693 | A1* | 4/2022 | Mashargah | H04L 41/34 |
| 2022/0158926 | A1* | 5/2022 | Wennerström | H04L 41/0853 |
| 2022/0209939 | A1* | 6/2022 | Skuliber | G06F 21/44 |
| 2022/0217139 | A1* | 7/2022 | Pieczul | H04L 63/101 |
| 2022/0222096 | A1* | 7/2022 | Archie | G06F 8/63 |
| 2022/0278900 | A1* | 9/2022 | Pieczul | H04L 41/22 |
| 2024/0333475 | A1* | 10/2024 | Da Canal | H04L 9/3263 |

OTHER PUBLICATIONS

Ip.com. "Dynamic Orchestration of Credential in Container Usage and Management without Downtime", Feb. 2022. (Year: 2022).*
Jurvanen, Karl-Juhan. "Using AWS Secrets Manager with Kubernetes." (2021). (Year: 2021).*
International Search Report and Written Opinion for PCT/US2023/065526 dated Jul. 31, 2023.
European Search Report issued in corresponding application 23785672.9 on Aug. 26, 2025.

* cited by examiner

SECURE UPDATE OF DYNAMIC CONFIGURATION IN CONTAINERIZED EXECUTION ENVIRONMENT

CROSS-REFERENCE TO RELATED APPLICATIONS

The present application claims priority from U.S. Provisional Patent Application No. 63/328,575, filed on Apr. 7, 2022, the disclosure of which is hereby incorporated by reference in its entirety.

BACKGROUND

Secure enterprise applications often require configuration information and credentials to interact with other components within a enterprise environment. For example, such secure enterprise applications require an active directory resource location and credentials, Kerberos credentials, or enterprise gateway component credentials.

In some instances, secure enterprise applications require that this configuration information must be persisted, including across restarts of the application. For example, it may be required to update a certificate associated with the application prior to expiration of a previous certificate. This update of a certificate occurs through interactions between application components.

Concurrently, containerized environments host applications which may be executed within such environments. Hosted applications are generally considered to be ephemeral; in particular, in the event of a failure, a new container may be instantiated, and an associated application may start executing within that container without regards to a previous version of the application in another container, and without substantial interruption to business operations.

It may be desirable to host secure enterprise applications within a containerized environment. However, it is undesirable for an application within a containerized environment to update or maintain its own credentials. For example, if the application becomes compromised, the application would be required to be re-instantiated. Either the credentials would be lost, or compromised credentials would be persisted across application restarts. This defeats, at least in part, the purpose of using such a containerized environment.

SUMMARY

In general, the present disclosure relates to methods and systems of indirectly updating credentials used by an application in a container-based execution environment. In examples, a separate container may be instantiated and managed within such an environment, and can include a service to maintain and update application credentials. The separate container may be inaccessible to one or more devices that would otherwise be able to compromise the application, thereby reducing a likelihood of compromise.

In a first aspect, a method of managing updates to configuration information of an application executing within a containerized execution environment is disclosed. The method includes instantiating an application container hosting a secure enterprise application, the secure enterprise application requiring secure configuration information for interaction via a secured connection with one or more remote endpoints from within the application container. The method also includes maintaining, within the containerized execution environment, a configuration container separate from the application container, the configuration container maintaining the secure configuration information apart from and on behalf of the secure enterprise application.

In a second aspect, a configuration information management system useable within a containerized execution environment is disclosed. The configuration information management system includes a configuration container maintained within a containerized execution environment separately from an application container hosting a secure enterprise application, the secure enterprise application requiring secure configuration information for interaction via a secured connection with one or more remote endpoints from within the application container. The configuration container hosts a service that is configured to maintain the secure configuration information on behalf of the secure enterprise application, and the secure enterprise application does not persist secure configuration information within the application container.

In a third aspect, a configuration information management system is disclosed. The system includes an application container instantiated in an application namespace, the application container hosting a secure enterprise application, the secure enterprise application requiring secure configuration information for interaction via a secured connection with one or more remote endpoints from within the application container. The system further includes a configuration container instantiated in the application namespace, the configuration container hosting a service configured to maintain the secure configuration information on behalf of the secure enterprise application.

DETAILED DESCRIPTION

As briefly described above, embodiments of the present invention are directed to methods and systems of indirectly updating credentials in a container-based execution environment. In examples, a separate container may be instantiated and managed within such an environment, and can include a service to maintain and update application credentials. The separate container may be inaccessible to one or more devices that would otherwise be able to compromise the application, thereby reducing a likelihood of compromise.

In accordance with the example embodiments, the methods and systems described herein utilize particular existing mechanisms within a container-based execution environment, while avoiding the requirement that the application executing within the container maintains its own credentials. Rather, updated credentials may be presented to stateless applications, as well as applications that maintain their own state. Additionally, applications that may be compromised are incapable of corrupting existing credentials, since those credentials are not maintained within the application itself. Such applications are unable to modify or update credentials, or persist compromised credentials as part of an application configuration. Compromised applications may be easily addressed by restarting the application within the containerized environment, thereby applying updated credentials.

By way of illustration, aspects of the present application may be implemented within the Kubernetes container orchestration environment. In that environment, an extension called "immutable secrets" has been introduced, in which configuration information may be shared with a containerized application. In that context, such immutable secrets cannot be updated, but only may be deleted and replaced. If such secrets are deleted and replaced, the containerized application is also required to be updated. This updating of the containerized application can be computationally costly or otherwise incur downtime. Where containerized applications support critical functionality (e.g., in the case of enterprise security applications), such an approach may be unduly disruptive to enterprise operations.

In example implementations, management of containerized applications may be particularly useful in circumstances where the containerized application requires significant uptime but may also involve periodic or frequent updates to configuration information. In an example implementation, a containerized application may take the form of a certificate enrollment gateway. Such a certificate enrollment gateway may assign a digital identity to third party entities, and maintaining or managing such digital identities. These digital identities may allow a given entity to "trust" peer entities that likewise have digital identities. In such arrangements, the certificate enrollment gateway (CEG) receives untrusted requests from candidate devices, and assesses whether requests should be honored. The CEG will then perform a registration process with a certificate authority (CA), optionally via an intermediary gateway, or CA gateway (CAGW), acting on behalf of a certificate authority. In further implementations, discussed briefly below, the CA gateway may be containerized in addition to, or in place of, the CEG.

Figure 1A:
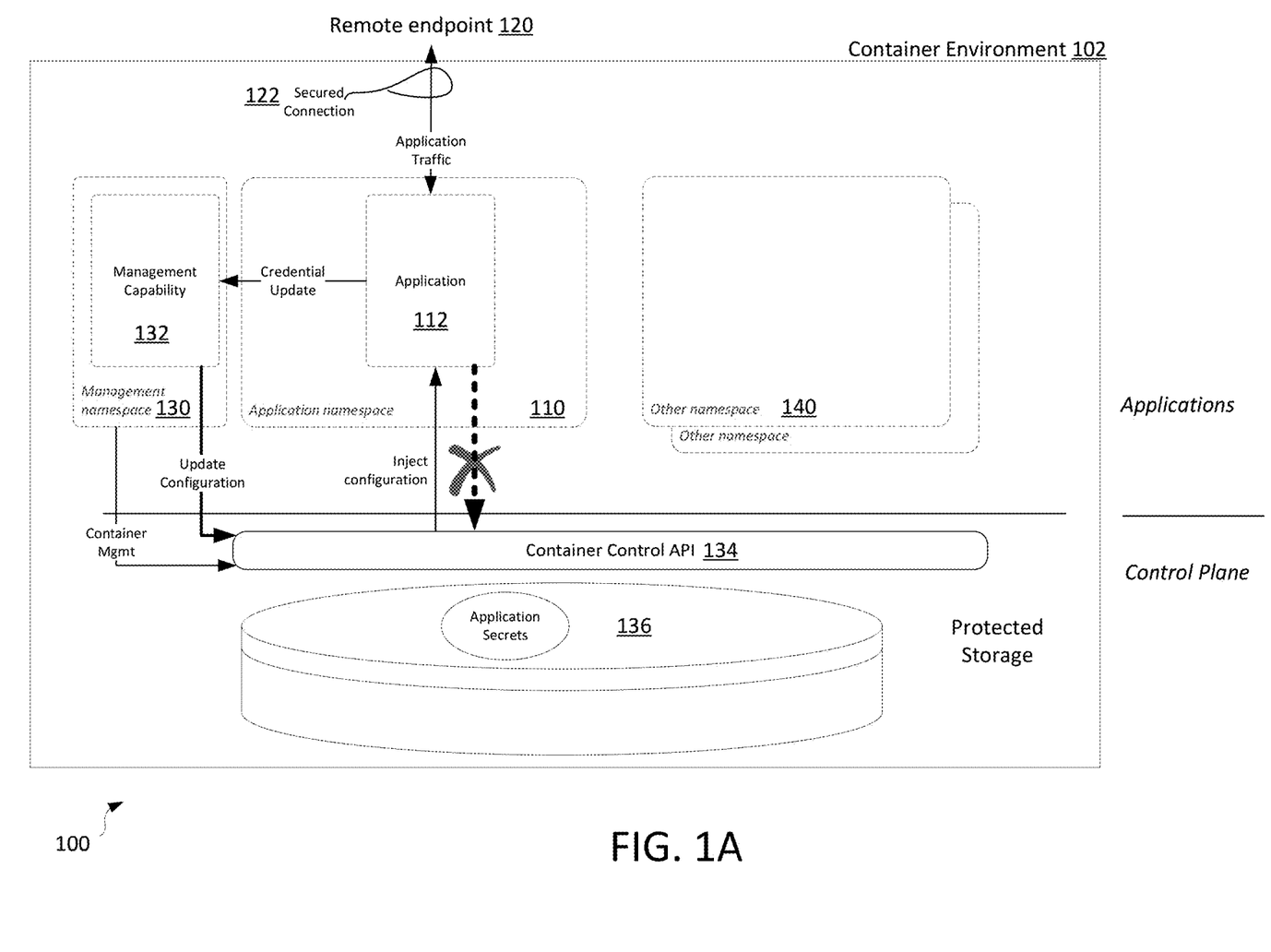
FIG. 1A illustrates a first example environment in which aspects of the present disclosure may be implemented.

FIG. 1A illustrates a first example environment 100 in which aspects of the present disclosure may be implemented. In general, the example environment 100 represents a container-based execution environment usable within an enterprise.

In the example shown, the example environment 100 includes a containerized execution environment 102. In example implementations, the containerized execution environment 102 may be implemented using the Kubernetes open source container orchestration system.

Within the containerized execution environment 102, a plurality of namespaces may be created. In the example shown an application namespace 110 may contain an application container 112, within which one or more applications may reside and execute. An example implementations, a secure enterprise application may be included within the application container 112. Other applications may be included within the application namespace 110, either within the application container 112 or in other application containers.

In the example shown, an application within the application container 112 may communicate with a remote endpoint 120, for example via a secured connection 122. In examples where the application executing within the application container 112 is a secure enterprise application, that secure enterprise application may be configured to issue security credentials to one or more remote endpoints within the enterprise. A variety of other types of enterprise applications may be implemented as well.

In the example shown, other namespaces may be created within the containerized execution environment 102. As shown, a management namespace 130 and one or more other namespaces 140 may be established. The management namespace 130 may include management capabilities 132, which interact with a container control API 134. The container control API 134 may be used to interact with application containers such as application container 112 to provide configuration information to that container. In this way, application containers do not require storage of their own configuration information, and may be altered, destroyed, re-created, and re-loaded with new or updated configuration information as needed. Accordingly, applications executing within application containers may be considered ephemeral, since no specific state or configuration information will be required to be maintained within such containers.

A protected storage location 136 may retain application configuration information, such as application secrets 138 or other secure configuration information. The protected storage location 136 is accessible via the container control API 134. Both reside within a control layer of the containerized execution environment 102, while the namespaces 110, 130, 140 reside within an application layer.

In operation, the management capability 132 within management namespace 130 may interact with other containers within the containerized execution environment 102 via a standard interface to the container control API 134. For example, when an application container, such as application container 112 is desired, the management capability 132 may launch a target application within such a container via container management commands. The management capability 132 may, as part of launching the target application within a container, also create an application namespace associated with that container.

In examples where the containerized execution environment 102 corresponds to a Kubernetes open source container orchestration system, the application container 112 may be implemented as a Kubernetes pod. However, in other implementations other container types may be used.

Upon instantiation, the application within application container 112 may interact with a remote endpoint 120 as described above. To interact with the remote endpoint 120 the application may require secure configuration information, such as a secure credential. In the implementation shown, the secure credential may be provided to the application container 112 upon instantiation of the application within that container, as part of the injected configuration. In such an implementation, the management capability 132 retains, or at least retains access to, the secure configuration information.

On occasion, the management capability 132, or alternatively, the application within application container 112 itself, may be required to update its associated secure configuration information. For example, on occasion a credential such as a PM certificate may require replacement due to the expiration date of that certificate approaching. In such circumstances, the application executing within the application container 112 may receive an update to its own credentials, and send updated credentials to the management capability 132 for storage. While the application would perform the negotiation of updated configuration information, that application does not, in conjunction with aspects of the present disclosure, possess privileges necessary to update a stored value of that configuration information. Rather, the management capability 132 may retain the updated credentials, and transmit the updated configuration to the container control API 134. The container control API 134 may then inject the updated configuration data into the application container 112 for use by the application executing therein.

Figure 1B:
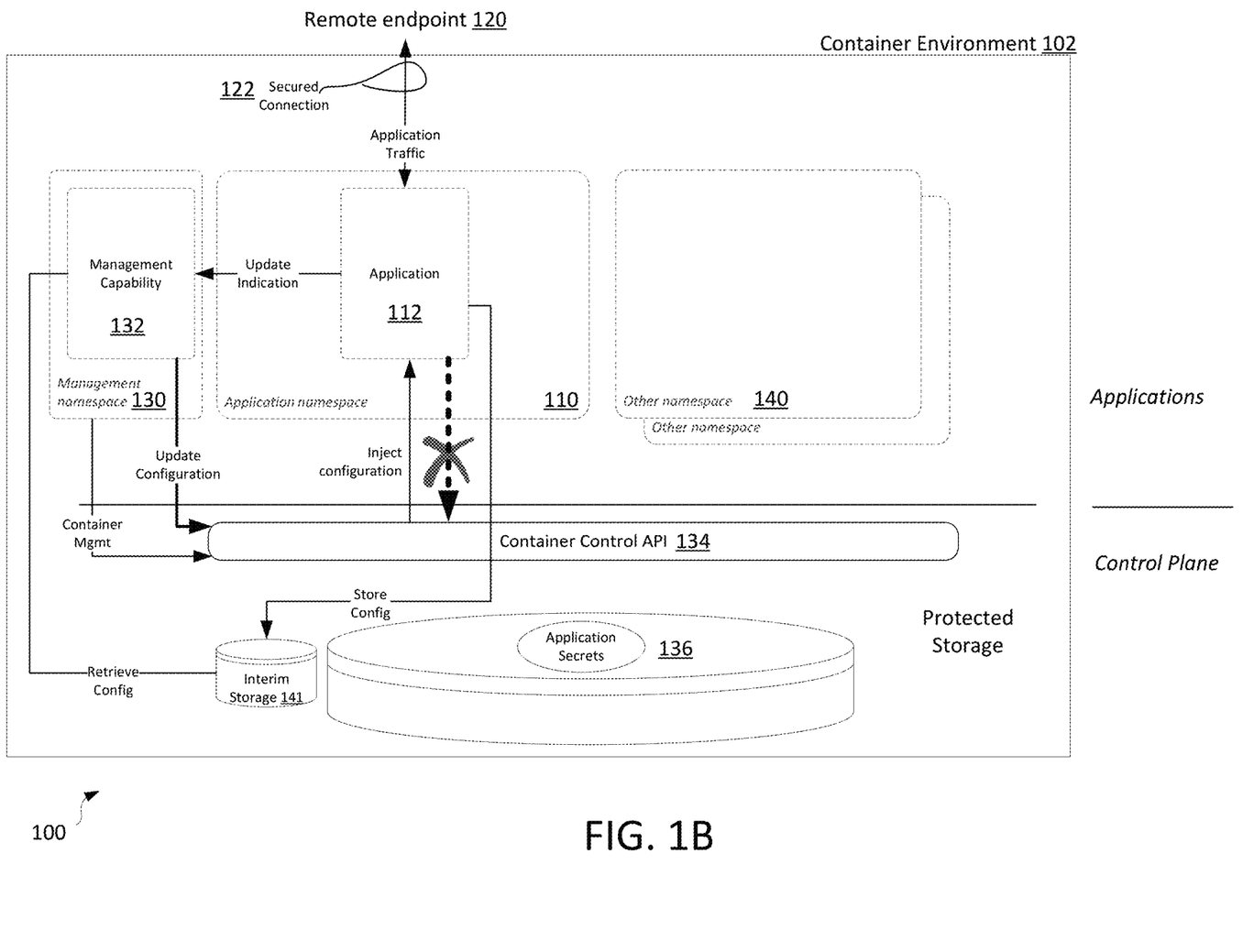
FIG. 1B illustrates a variation of updating a credential within the first example environment of FIG. 1A.

In an alternative arrangement, such as is shown in FIG. 1B, the application executing within the application container may directly receive an update to its own configuration information, and store updated configuration information in a storage location 141. In this variant, the application may send an indication that updated configuration information has been stored within the storage location 141 to the management capability 132. In this arrangement, the management capability 132 receives such a message from the application within the application container 112 (i.e. the "Update Indication" seen in FIG. 1B) and can retrieve the configuration information from a storage location 141. The management capability 132 can then update the configuration information on behalf of the application for use within the application container 112, and send updated configuration information to the container control API 134. The container control API 134 may then inject a new configuration into the application container 112. The specific implementation of how the application within the application container 112 performs a renewal or request for updated configuration information may vary according to the embodiments of the present disclosure.

Figure 2:
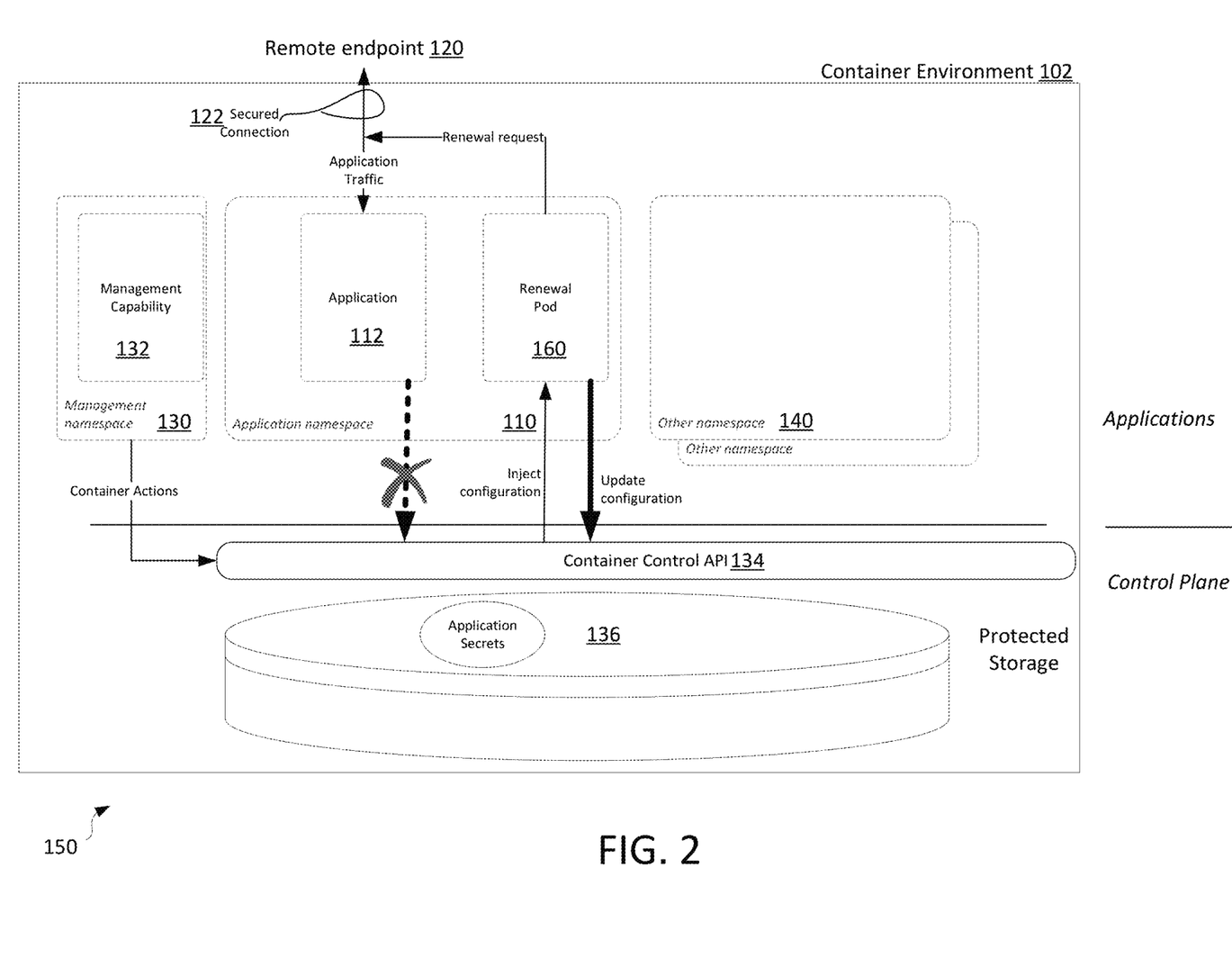
FIG. 2 illustrates a second example environment in which aspects of the present disclosure may be implemented.

FIG. 2 illustrates a second example environment 150 in which aspects of the present disclosure may be implemented. In general, the second example environment 150 includes analogous features to environment 100 of FIG. 1. However, maintenance of secure configuration information for the application within the application container 112 differs in this arrangement. In particular, while in the previous example the application within the application container 112 or management capability 132 cooperate to negotiate and update the updated secure configuration information, in the environment 150 a separate configuration container 160 may be instantiated within the application namespace 110. In this example, the configuration container 160, denoted as "renewal pod", receives initial secure configuration information and is responsible for updating that configuration information as needed.

In such an arrangement, the management capability 132 may launch the target application within the application container 112. The management capability 132 will also provide configuration information to the configuration container 160. The configuration container 160 is created, for example, at the time of the application container 112, and is provided with sufficient privileges to allow it to update the configuration data for both itself and the application container. For example, as depicted, the configuration container 160 may transmit a configuration data renewal request (e.g., a certificate renewal request) and receive a renewed certificate, which it may then provide by way of updated configuration data to the container control API 134. The container control API 134 may then store that data in a protected storage location 136. In example embodiments, at the time of renewal, the application container 112 may be created or re-created, with access to the configuration data (e.g., the updated certificate or other credential as required).

In example embodiments, the configuration container 160 may be configured to be continually running, or may be launched on a periodic basis. The configuration container 160 will conduct a renewal request independently of any activity of the application executing within the application container 112. The configuration container 160, because it has the current configuration data, can authenticate with a remote endpoint 120, and acts as authentication for both itself and for the application executing within the application container 112.

In particular embodiments, the configuration container 160 may be useful for managing configuration data for application container 112 or other application containers within the application namespace 110. However, the configuration container 160 may be incapable of modifying configuration data for any other applications, for example within other application namespaces 140.

Referring to FIGS. 1-2, as noted above, in example implementations the application container 112 may host an application that implements a certificate enrollment gateway (CEG). When in use, a CEG is required to be trusted by a certificate authority (CA) and any certificate authority gateway acting on behalf of the CA, since the CEG performs registration with the CA on behalf of candidate devices from which it receives requests. Accordingly, the remote endpoint 120 may represent any of a candidate device, a CAGW, or CA.

In this application, the CEG is required to store certain secure credentials that allow the CEG to be trusted by the CA or CAGW. For example, a CEG may be required to store a credential, issued at a time of provisioning, for directly authenticating the CEG to the CA or CAGW, or for use in negotiating for another certificate. In such cases, the credential may be stored as a secret by the CEG, for example including public and private keys issued externally and provided to the CEG. In such instances, the CEG will be implemented as an application within the application container 112, but the credential may be updated via the management capability 132, and optionally stored at storage location 141 for application to the application container 112 via the container control API 134.

In other cases, the credential may be a one-time credential stored as a secret, but exchanged through a renewal protocol for a second credential that will be used by the application container 112. In this arrangement, the one-time credential may be managed and/or stored by the management capability, or may be managed at the configuration container 160. Similarly, the second credential, which may be a credential used by the CEG directly, may also be managed using the management capability 132 and/or configuration container.

In a still further example application, the application container 112 may host an application that implements a certificate authority gateway (CAGW). In this instance, the credential that is required to be updated corresponds to a credential used by the CAGW to be trusted by a certificate authority (CA). The CAGW may maintain a credential for each CA to which it has an association.

Figure 3:
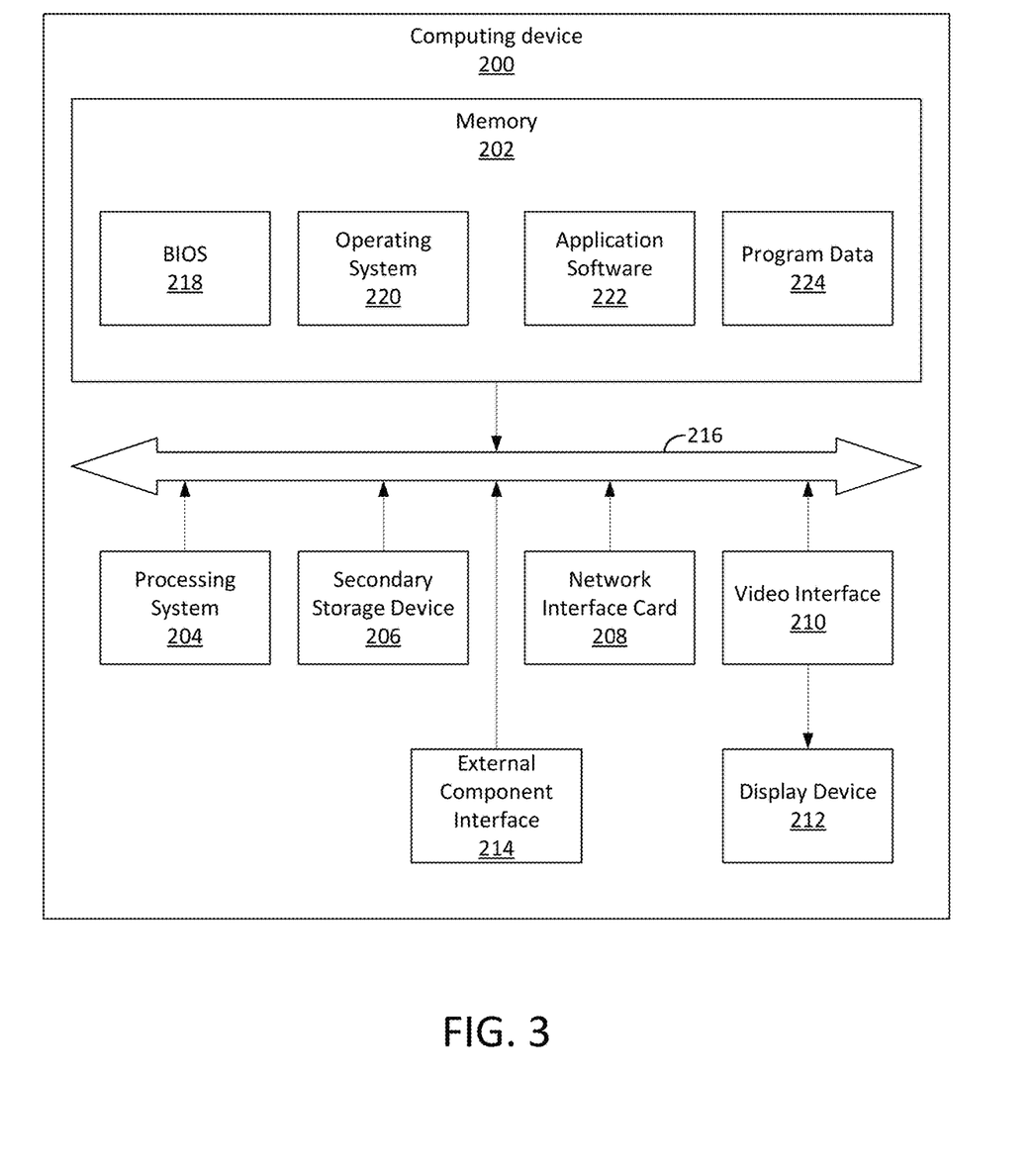
FIG. 3 illustrates an example computing system with which aspects of the present disclosure may be implemented.

FIG. 3 illustrates an example computing system with which aspects of the present disclosure may be implemented. The computing device 200 can be used, for example, as a single device or a networked group of devices to implement the containerized execution environment 102, remote endpoint 120, or any other computing device useable as described above in connection with FIGS. 1-2.

In the example of FIG. 3, the computing device 200 includes a memory 202, a processing system 204, a secondary storage device 206, a network interface card 208, a video interface 210, a display unit 212, an external component interface 214, and a communication medium 216. The memory 202 includes one or more computer storage media capable of storing data and/or instructions. In different embodiments, the memory 202 is implemented in different ways. For example, the memory 202 can be implemented using various types of computer storage media, and generally includes at least some tangible media. In some embodiments, the memory 202 is implemented using entirely non-transitory media.

The processing system 204 includes one or more processing units, or programmable circuits. A processing unit is a physical device or article of manufacture comprising one or more integrated circuits that selectively execute software instructions. In various embodiments, the processing system 204 is implemented in various ways. For example, the processing system 204 can be implemented as one or more physical or logical processing cores. In another example, the processing system 204 can include one or more separate microprocessors. In yet another example embodiment, the processing system 204 can include an application-specific integrated circuit (ASIC) that provides specific functionality. In yet another example, the processing system 204 provides specific functionality by using an ASIC and by executing computer-executable instructions.

The secondary storage device 206 includes one or more computer storage media. The secondary storage device 206 stores data and software instructions not directly accessible by the processing system 204. In other words, the processing system 204 performs an I/O operation to retrieve data and/or software instructions from the secondary storage device 206. In various embodiments, the secondary storage device 206 includes various types of computer storage media. For example, the secondary storage device 206 can include one or more magnetic disks, magnetic tape drives, optical discs, solid-state memory devices, and/or other types of tangible computer storage media.

The network interface card 208 enables the computing device 200 to send data to and receive data from a communication network. In different embodiments, the network interface card 208 is implemented in different ways. For example, the network interface card 208 can be implemented as an Ethernet interface, a token-ring network interface, a fiber optic network interface, a wireless network interface (e.g., WiFi, WiMax, etc.), or another type of network interface.

In optional embodiments where included in the computing device 200, the video interface 210 enables the computing device 200 to output video information to the display unit 212. The display unit 212 can be various types of devices for displaying video information, such as an LCD display panel, a plasma screen display panel, a touch-sensitive display panel, an LED screen, a cathode-ray tube display, or a projector. The video interface 210 can communicate with the display unit 212 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 214 enables the computing device 200 to communicate with external devices. For example, the external component interface 214 can be a USB interface, a FireWire interface, a serial port interface, a parallel port interface, a PS/2 interface, and/or another type of interface that enables the computing device 200 to communicate with external devices. In various embodiments, the external component interface 214 enables the computing device 200 to communicate with various external components, such as external storage devices, input devices, speakers, modems, media player docks, other computing devices, scanners, digital cameras, and fingerprint readers.

The communication medium 216 facilitates communication among the hardware components of the computing device 200. The communication medium 216 facilitates communication among the memory 202, the processing system 204, the secondary storage device 206, the network interface card 208, the video interface 210, and the external component interface 214. The communications medium 216 can be implemented in various ways. For example, the communications medium 216 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 202 stores various types of data and/or software instructions. The memory 202 stores a Basic Input/Output System (BIOS) 218 and an operating system 220. The BIOS 218 includes a set of computer-executable instructions that, when executed by the processing system 204, cause the computing device 200 to boot up. The operating system 220 includes a set of computer-executable instructions that, when executed by the processing system 204, cause the computing device 200 to provide an operating system that coordinates the activities and sharing of resources of the computing device 200. Furthermore, the memory 202 stores application software 222. The application software 222 includes computer-executable instructions, that when executed by the processing system 204, cause the computing device 200 to provide one or more applications. The memory 202 also stores program data 224. The program data 224 is data used by programs that execute on the computing device 200.

Although particular features are discussed herein as included within an electronic computing device 200, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 200 of FIG. 3, the computer-readable instructions are stored on devices that include non-transitory media. In particular embodiments, the computer-readable instructions are stored on entirely non-transitory media.

Figure 4:
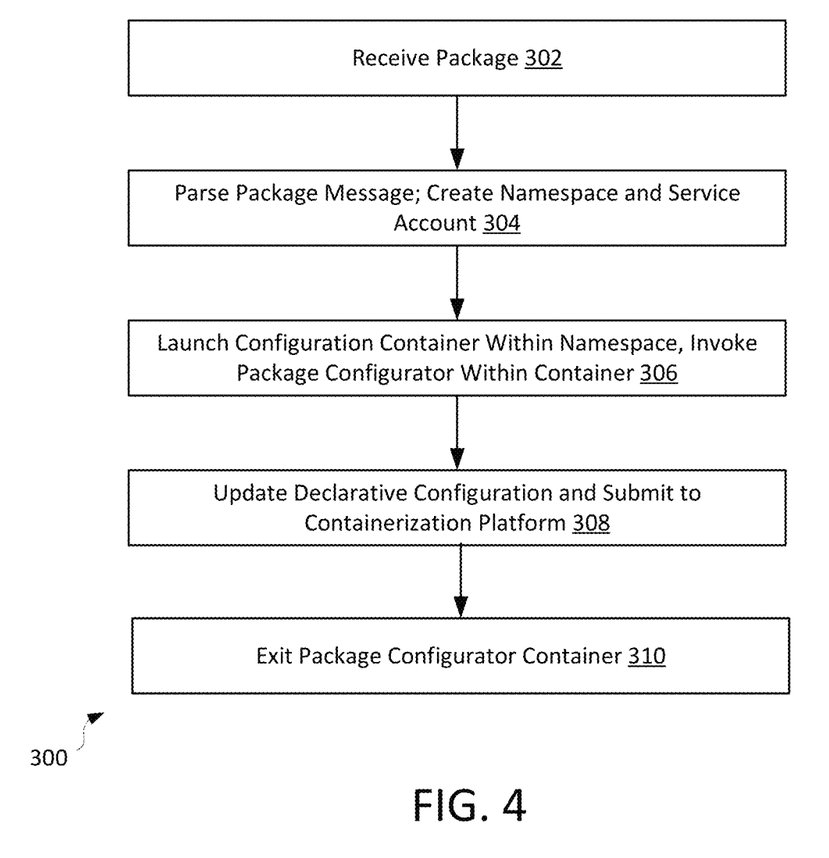
FIG. 4 is a flowchart of a method of installing secure configuration information within an application container according to an example embodiment.
Figure 5:
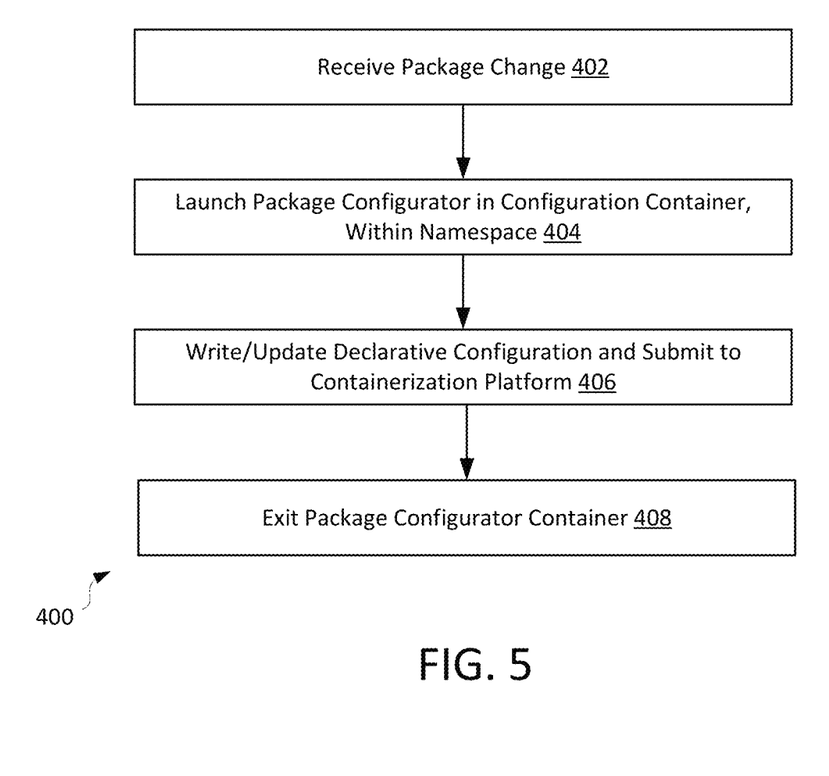
FIG. 5 is a flowchart of a method of updating secure configuration information at a configuration container according to an example embodiment
Figure 6:
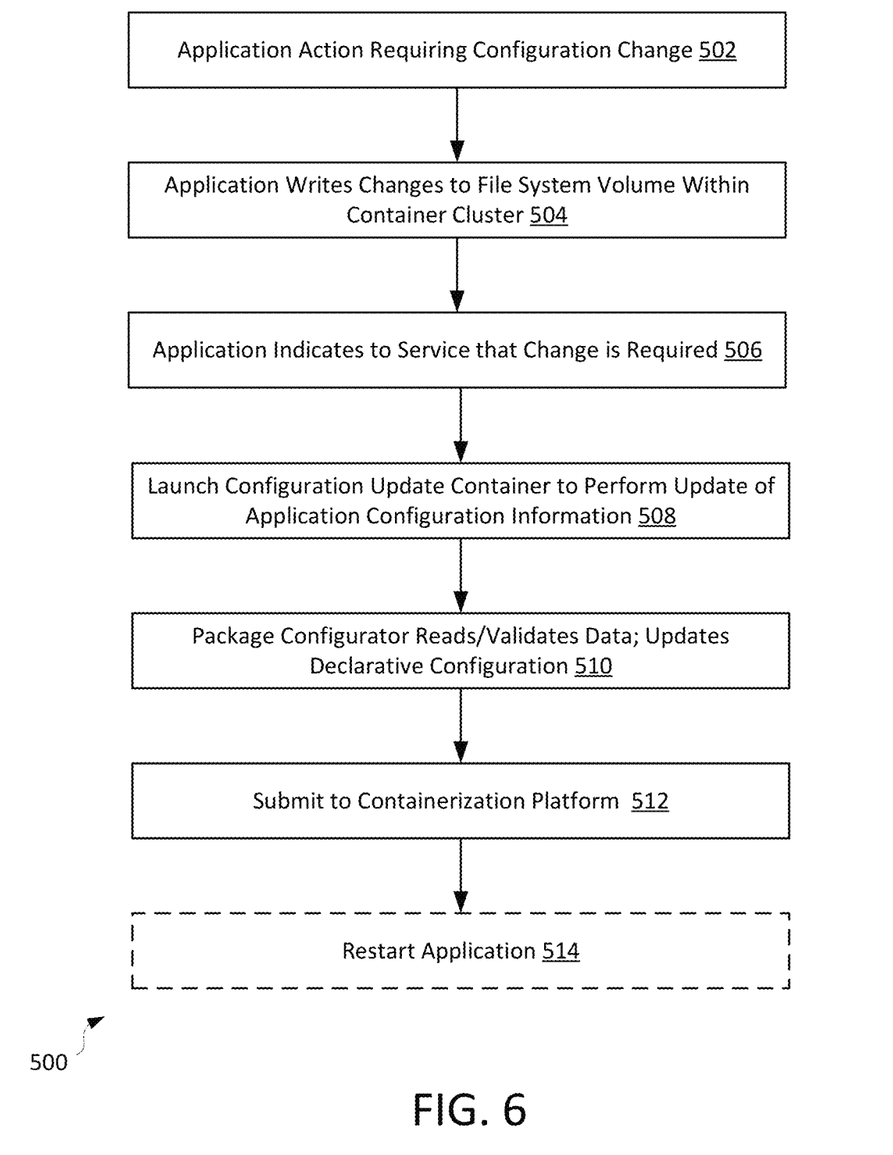
FIG. 6 is a flowchart of a method of updating secure configuration information at an application container in response to receipt of updated secure configuration information at a configuration container according to an example embodiment.

Referring now to FIGS. 4-6, example embodiments are illustrated which describe methods of loading and updating configuration data for use by applications executing within a containerized execution environment. The example methods described herein may be implemented within the environments of FIGS. 1-2, for example to implement the detailed configuration data updating use cases described below in conjunction with FIGS. 7-8.

FIG. 4 is a flowchart of a method 300 of installing secure configuration information within an application container, according to an example embodiment. The method 300 may be performed, for example, at initial instantiation of an application container, such as application container 112 described above in FIGS. 1-2.

In the example shown, the method 300 includes receiving a package that includes configuration information (step 302). The package including configuration information may be received from a remote system, such as from enterprise security management software, e.g., a certificate authority or certificate authority gateway. The configuration information may be collected for use in an on premises environment in which a containerized execution environment is implemented.

The method 300 also includes parsing the package that is received, and performing one or more set up steps to enable the creation of an application container (step 304). The one or more setup steps may include, for example, creating a namespace, such as an application namespace 110. The set up steps may also include creating a service account that may be used for managing the configuration information. In example implementations, the set up steps may be performed at a management capability (e.g., management capability 132), such as an entitlements service as depicted below in FIGS. 7-8.

In the example shown, the method 300 further includes launching a configuration container within the created namespace (step 306). A package configurator can be invoked within the configuration container. Because the configuration container is invoked using the service account authorization from the set up steps performed by the management capability, and executes within the created namespace, the configuration container will be able to manage such configuration data on behalf of the application executing within the application container.

In the example shown, the method 300 further includes updating configuration data for any application objects that are to be created (step 308). For example, declarative configuration statements in YAML and/or Helm charts may be passed to the container control API 134, for creation of the application container (e.g. application container 112 described above). Upon completion of updating the application objects, the configuration container may optionally either be persisted to manage configuration information, or may be exited (step 310). If exited, the configuration container may be re-instantiated periodically to check and/or update configuration information as needed by the application with which it is associated.

FIG. 5 is a flowchart of a method 400 of updating secure configuration information at a configuration container, according to an example embodiment. The method 400 may be performed, for example, to update configuration information based on updated entitlement information or updated information received from remote enterprise security management software (step 402).

In the example shown, the method 400 includes, in response to receipt of updated configuration information, launching a configuration container having service account privileges relative to the application container 112 within which the application that is to receive the configuration information is executing (step 404). In example embodiments, launching the configuration container can include launching a package configurator within the configuration container, which is instantiated in a same application namespace as the application container 112. The method further includes writing declarative configuration information for submission to the container control API 134 (step 406). The container control API 134 may then, for example, store the declarative configuration information in a shared storage, such as storage location 136. The method 400 can further include exiting the configuration container upon completion of writing the declarative configuration information to the container control API 134, and optionally receiving confirmation of the same (step 408).

Referring to FIGS. 4-5 generally, in accordance with the examples described above in which the application executing within the application container 112 corresponds to a certificate enrollment gateway (CEG), a credential establishment and/or renewal protocol may be implemented for use with the management capability 132 and/or configuration container 160. In an example implementation, the management capability 132 may initially launch the configuration container 160 using a one-time credential (e.g., at step 306), and the configuration container 160 may update the credential. Once the credential is updated, the application container 112 may be launched and provided the newly-updated (and stored) credential (at step 308), before the configuration container 160 is exited. Periodically, an update to the credential may be initiated from the management capability 132, or autonomously scheduled via the container control API 134 (at FIG. 5, step 402). This may cause the configuration container 160 to be launched (step 404), which will check for whether a credential update is required. If a credential update is required, it will complete that action on behalf of the application within the application container 112 (step 406). Upon completion (or determining that no update is required), the configuration container will then exit (step 408).

Optionally, the application within the application container, i.e., the CEG, can trigger this sequence if it is determined at the CEG that such an update is necessary.

In instances where the application executing within the application container 112 corresponds to a certificate authority gateway (CAGW), similar mechanisms may be performed; however, such credential updates may be required to be performed for each certificate authority (CA) to which the CAGW is associated, and different methods of updating and different types of credentialing information may be used by each. In example embodiments, separate configuration containers 160 may be instantiated for updating the CAGW for each CA association, with each configuration container having instructions associated with the manner of updating and types of configuration data to be updated. In alternative embodiments, only one configuration container may be used, and implemented for all CA associations (which may be updated at the same time, or independently on an as-needed basis).

FIG. 6 is a flowchart of a method 500 of updating secure configuration information at an application container in response to receipt of updated secure configuration information at a configuration container, according to an example embodiment. Updating of the application may be performed, for example, based on previous receipt of updated configuration information as described above.

In general, the method 500 is performed in order to provide configuration information to an application executing within an application container, while avoiding the requirement that the application container itself stores the configuration information. Accordingly, if the application container 112 or application executing within that container is corrupted, the application may be halted and application container exited and subsequently restarted with refreshed configuration information. Accordingly, each application container will not be required to persist information thereby avoiding potential persisting of corrupted or compromised data.

In the example shown, the method 500 includes determining that an application executing within the containerized execution environment has performed an action that requires a change to configuration that was provided to the application container upon its startup (step 502). The change to configuration may be, for example a changed secret or configuration map that was provided to the application container. In some implementations, the application that executes within an application container may write a limited number of configuration changes to a file system volume within the application container (step 504). For example in some implementations the application may write up to five changes to configuration information to a file system volume. Changes that are written to the file system volume may also be passed to a management capability, such as an entitlement service via an API connecting between the application container and the management capability.

Notably, the application executing within the application container may not change its own configuration information autonomously because it lacks authorization, within the context of the containerized execution environment, to do so. Accordingly, the application will indicate to the management capability (e.g., an entitlement service) that a change to configuration information is required (step 506). This communication may be performed, for example, using an API exposed by an entitlement service to the application or via a separate API exposed between an aspect of the management capability and the application.

In the example shown, the method 500 includes launching a configuration container to perform update of application configuration information (step 508). In example embodiments the configuration container may be a configuration update container and launching the configuration update container may be performed by the management capability (e.g., and entitlements service notifying an update processor that an update is required). The configuration update container may be the same container as a configuration container, or may be a different container instantiated within the application namespace. An example of such a configuration is seen in FIG. 8, described below.

In the example shown, the method 500 further includes reading and validating data that is received, for example obtained from the storage area or received via an API (step 510). The method 500 further includes updating configuration data for any application objects that are to be updated (step 512). For example, declarative configuration statements in YAML and/or Helm charts may be passed to the container control API 134, for creation and/or updating of the application container (e.g. container 112 described above). As in FIG. 4, above, upon completion of updating the application objects, the configuration container may optionally either be persisted to manage configuration information, or may be exited. If exited, the configuration container may be re-instantiated periodically to check and/or update configuration information as needed by the application with which it is associated.

Notably, the method 500 also includes restarting the application executing within the application container (step 514). Typically, the application will need to be restarted upon receipt of updated secure configuration information, and therefore it may be advantageous to re-instantiate the application container and associated application.

Figure 7:
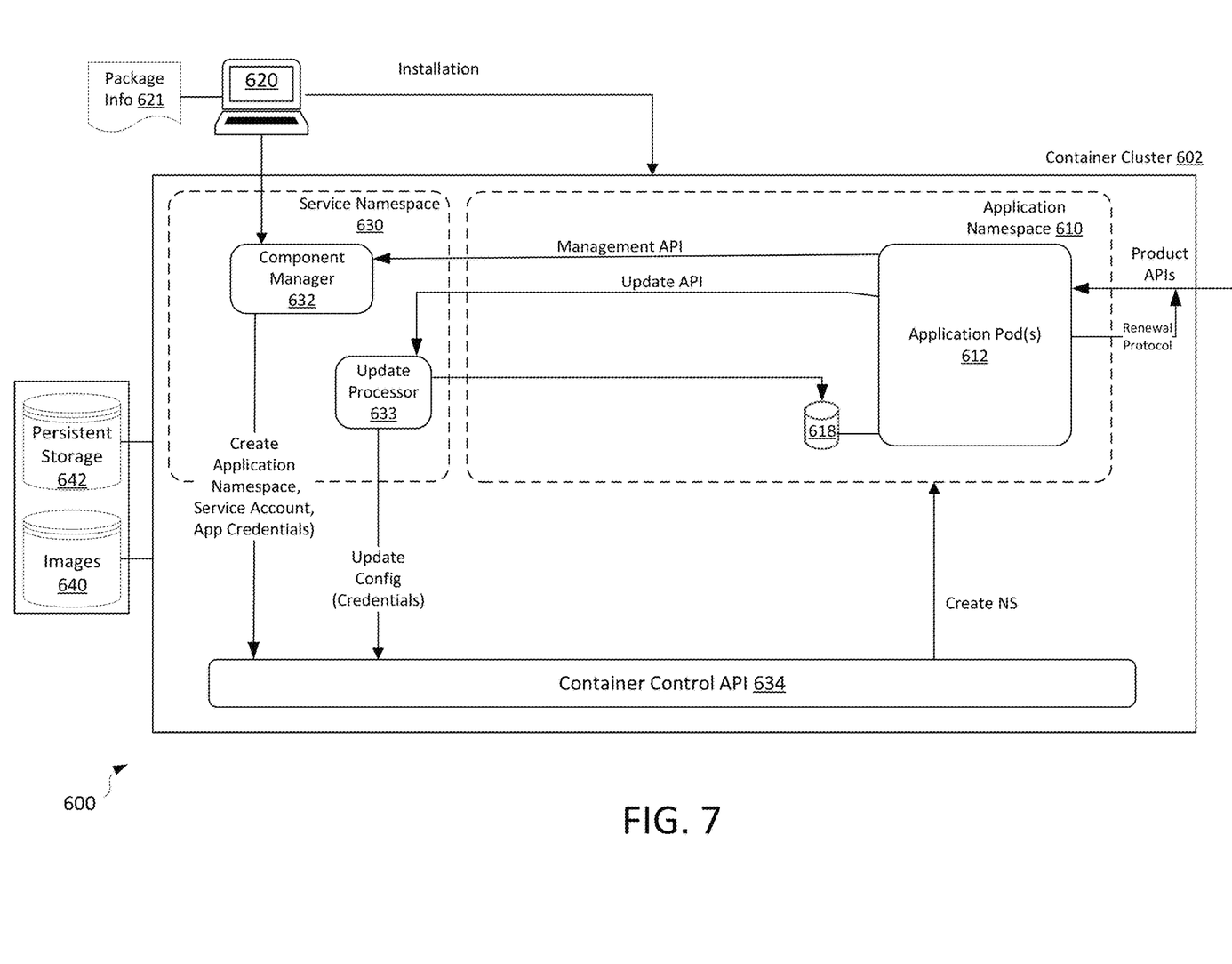
FIG. 7 illustrates a container-based architecture that depicts example interactions among a containerized application and associated services to provide secure configuration information to an application within an application container.
Figure 8:
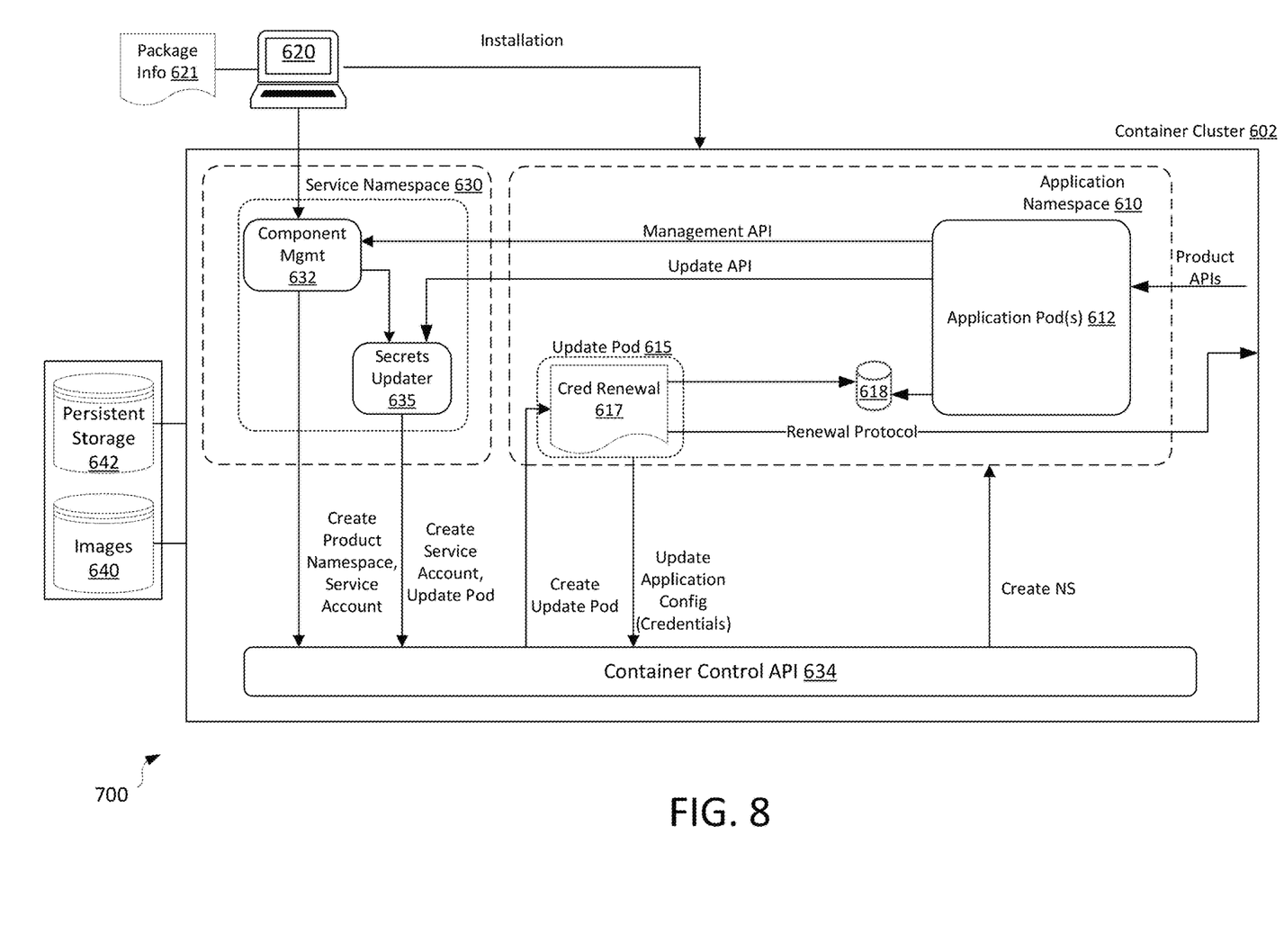
FIG. 8 illustrates a container-based architecture that depicts example interactions among a containerized application and associated services to provide a certificate renewal service to an application within an application container.

Referring to FIGS. 7-8, specific implementations of a containerized execution environment is illustrated in which the methods of FIGS. 4-6 may be used to create and update secure configuration information, such as certificate information. The implementations shown in FIGS. 7-8 are particular versions of the containerized execution environments illustrated above in conjunction with FIGS. 1-2.

FIG. 7 illustrates a first container-based architecture implementation 600, that depicts example interactions among a containerized application and associated services to provide secure configuration information to an application within an application container. In this example, a remote computing system 620 communicates with a containerized execution environment 602 to deliver secure configuration information in the form of a package 621 including the configuration information. In particular, the remote computing system 620 may instantiate installation of the containerized execution environment 602, and subsequently deliver to a component manager 632 within a service namespace 630 a package and entitlements used for local configuration of the containerized execution environment 602. The component manager 632 may form at least a portion of the management capability 132 described above in FIGS. 1-2.

In the example shown, the component manager 632 can create an application namespace 610, and provide service account and application credentials, via communication with a container control API 634, which acts to create the namespace 610 and application pod(s) 612.

In the example shown, the application executing within the application pod(s) 612 may be accessible via one or more product APIs from other remote endpoints, e.g., a certificate gateway and/or certificate authority. The application within the application pod(s) 612 may communicate with such a remote endpoint (e.g. a CA or CAGW) in accordance with a renewal protocol, e.g., to update a credential or configuration data in accordance with a particular protocol defined by the system required to trust the application. Configuration data may be stored, for example, in a shared storage location 618 within the application namespace 610, e.g., accessible to the application pod(s) 612.

The shared storage location 618 may be where some portion of configuration updates may be written by the application executing within the application pod(s) 612 (as noted above); when required, the update processor 633 may access the shared volume 618 and rewrite configuration information to the container control API 634, which may also persist that data to persistent storage 642.

In the example shown, an application within the application pod(s) may access the component manager 632 via a management API, and may further communicate with an update processor 633 within the service namespace via an update API. When the application within application pod(s) 612 receives updated configuration information in FIG. 7 (e.g., based on the application performing its own update, as described in conjunction with FIGS. 1A-1B, above, the application can send such updates to the update processor 633, which may both store that updated data within the shared storage location 618. The update processor 633 may also communicate the updated configuration data (e.g., credentials) to the container control API 634, which may make those credentials accessible to the application pod(s) 612. The update processor 633, in this example, represents an example of a configuration container.

As illustrated in FIG. 8, a further example implementation 700 is shown. This implementation utilizes a secrets updater 635 and an update pod 615 to assist with updating of configuration information on behalf of the application executing within the application pod(s) 612. Accordingly, the example implementation 700 corresponds more closely to the configuration of FIG. 2, in which a separate renewal pod (configuration container 160) is selectively instantiated within the application namespace 110 to assist with configuration updates.

During an update process, the application executing within the application container 612 may indicate to the secrets updater 635 via an update API that a change to configuration information is required. The secrets updater 635 within the service namespace 630 will then launch (or communicate with) the update pod 615 with service account privileges to perform an update of configuration information for the application. In particular, a credential renewal service 617 is shown executing within the update pod 615, which obtains renewed configuration data, such as a renewed certificate via communication with a certificate authority gateway (CAGW) using a renewal protocol. The credential renewal service 617 may then provide the updated configuration data (e.g., certificate) to the container control API 634 which may persist that data and persistent storage 642. The credential renewal service 617 may also store the updated configuration data in the shared storage volume 618. The container control API 634 may provide the updated configuration data to the application within the application container 612, or the application may obtain that data from the shared storage volume 618.

In example embodiments the update pod 615 may run continually or be scheduled at a predetermined time, for example as controlled by the secrets updater 635. The update pod 615 may be configured to monitor and maintain configuration data of an application executing within the application container 612. In example embodiments, the update pod 615 may be maintained within the common execution cluster with the container housing the application (e.g., within namespace 610). The update pod 615 represents a further example of a configuration container, and in particular, an example of a renewal pod implemented as a configuration container 160.

Referring to FIGS. 1-8 generally, it is seen that configuration information storage and updating may be performed in a containerized environment while avoiding the requirement that the application executing within the container maintains its own credentials. Rather, updated credentials may be presented to stateless applications, as well as applications that maintain their own state, but which are not allowed to store such credentials. Additionally, applications that may be compromised are incapable of corrupting existing credentials, since those credentials are not maintained within the application itself. As noted above, compromised applications may be easily addressed by restarting the application within the containerized environment, thereby applying updated credentials.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of managing updates to configuration information of an application executing within a containerized execution environment, the method comprising:
   instantiating an application container hosting a secure enterprise application, the secure enterprise application requiring secure configuration information for interaction via a secured connection with one or more remote endpoints from within the application container; and
   maintaining, within the containerized execution environment, a configuration container separate from the application container, the configuration container maintaining the secure configuration information apart from and on behalf of the secure enterprise application, the configuration container comprising a renewal container;
   obtaining, at a renewal service executing within the renewal container, updated secure configuration information on behalf of the application executing within the application container; and
   updating the secure configuration data via the updated secure configuration information at the application executing within the application container by supplying the updated secure configuration information to the application from the renewal service.

2. The method of claim 1, wherein the configuration container includes a management service, the method further comprising:
   receiving, at the application container, updated secure configuration information, and
   communicating the updated secure configuration information, via a container management interface, to the management service.

3. The method of claim 2, further comprising, in response to updating the secure configuration information in the configuration container:
   launching a package configurator in response to receiving updated secure configuration information; and updating a declarative configuration and submitting the updated secure configuration information to the containerization platform for use at the application container.

4. The method of claim 1, wherein the renewal container interacts with the one or more remote endpoints to obtain the updated secure configuration information.

5. The method of claim 1, wherein the application container and the renewal container reside within a common application namespace.

6. The method of claim 5, wherein the renewal container lacks capabilities to update secure configuration information for application executing within the containerized execution environment but in a different namespace outside of the common application namespace.

7. The method of claim 1, wherein the secure configuration information comprises a certificate, and wherein the renewal container maintains a private key associated with the certificate.

8. The method of claim 1, wherein the secure enterprise application lacks credentials required to obtain updated secure configuration information.

9. A configuration information management system useable within a containerized execution environment, the system implemented using one or more processing units and a memory, the system comprising:
   a configuration container maintained within a containerized execution environment separately from an application container hosting a secure enterprise application, the secure enterprise application requiring secure configuration information for interaction via a secured connection with one or more remote endpoints from within the application container, the secure enterprise application comprising a certificate enrollment gateway;
   wherein the configuration container hosts a service that is configured to maintain the secure configuration information on behalf of the secure enterprise application,
   wherein the secure enterprise application does not persist secure configuration information within the application container, and
   wherein the secure configuration information comprises a security certificate issued from at least one of a certificate authority or a certificate authority gateway.

10. The configuration information management system of claim 9, wherein the containerized execution environment resides within an enterprise data center.

11. The configuration information management system of claim 9, wherein the configuration container is configured to update the secure configuration information on behalf of the secure enterprise application.

12. The configuration information management system of claim 9, wherein the secure configuration information comprises a security certificate.

13. A configuration information management system, the system implemented using one or more processing units and a memory, the system comprising:
   an application container instantiated in an application namespace within a containerized execution environment, the application container hosting an secure enterprise application, the secure enterprise application requiring secure configuration information for interaction via a secured connection with one or more remote endpoints from within the application container;
   a configuration container instantiated in the application namespace, the configuration container hosting a service configured to maintain the secure configuration information on behalf of the secure enterprise application; and
   a service namespace separate from the application namespace, the service namespace hosting a package processor configured to create the application namespace and a service account having privileges sufficient to manage the secure configuration information, wherein the service hosted in the configuration container is granted privileges associated with the service account to manage the secure configuration information on behalf of the secure enterprise application hosted in the application container.

14. The configuration information management system of claim 13, wherein the configuration container comprises a configuration update container hosting a certificate renewal service useable to update secure configuration information of the secure enterprise application.

15. The configuration information management system of claim 14, further comprising a shared storage space within the application namespace, the shared storage space being accessible by the secure enterprise application and the service.

16. The configuration information management system of claim 14, wherein the configuration update container implements a certificate renewal protocol on behalf of the secure enterprise application hosted in the application container.

17. The configuration information management system of claim 16, wherein an entitlements service is configured to instantiate the configuration update container in response to receiving a notification of a required change to the secure configuration information.

18. A method of managing updates to configuration information of an application executing within a containerized execution environment, the method comprising:
   instantiating an application container hosting a secure enterprise application, the secure enterprise application requiring secure configuration information for interaction via a secured connection with one or more remote endpoints from within the application container;
   maintaining, within the containerized execution environment, a configuration container separate from the application container, the configuration container including a management service and maintaining the secure configuration information apart from and on behalf of the secure enterprise application;
   receiving, at the application container, updated secure configuration information; and
   communicating the updated secure configuration information, via a container management interface, to the management service.

19. The method of claim 18, further comprising, in response to updating the secure configuration information in the configuration container:
   launching a package configurator in response to receiving updated secure configuration information; and
   updating a declarative configuration and submitting the updated secure configuration information to the containerization platform for use at the application container.

* * * * *